Dec. 8, 1964 A. W. DOYLE ETAL 3,160,686
PROCESS FOR MAKING CAPSULES
Filed Aug. 1, 1962 2 Sheets-Sheet 1
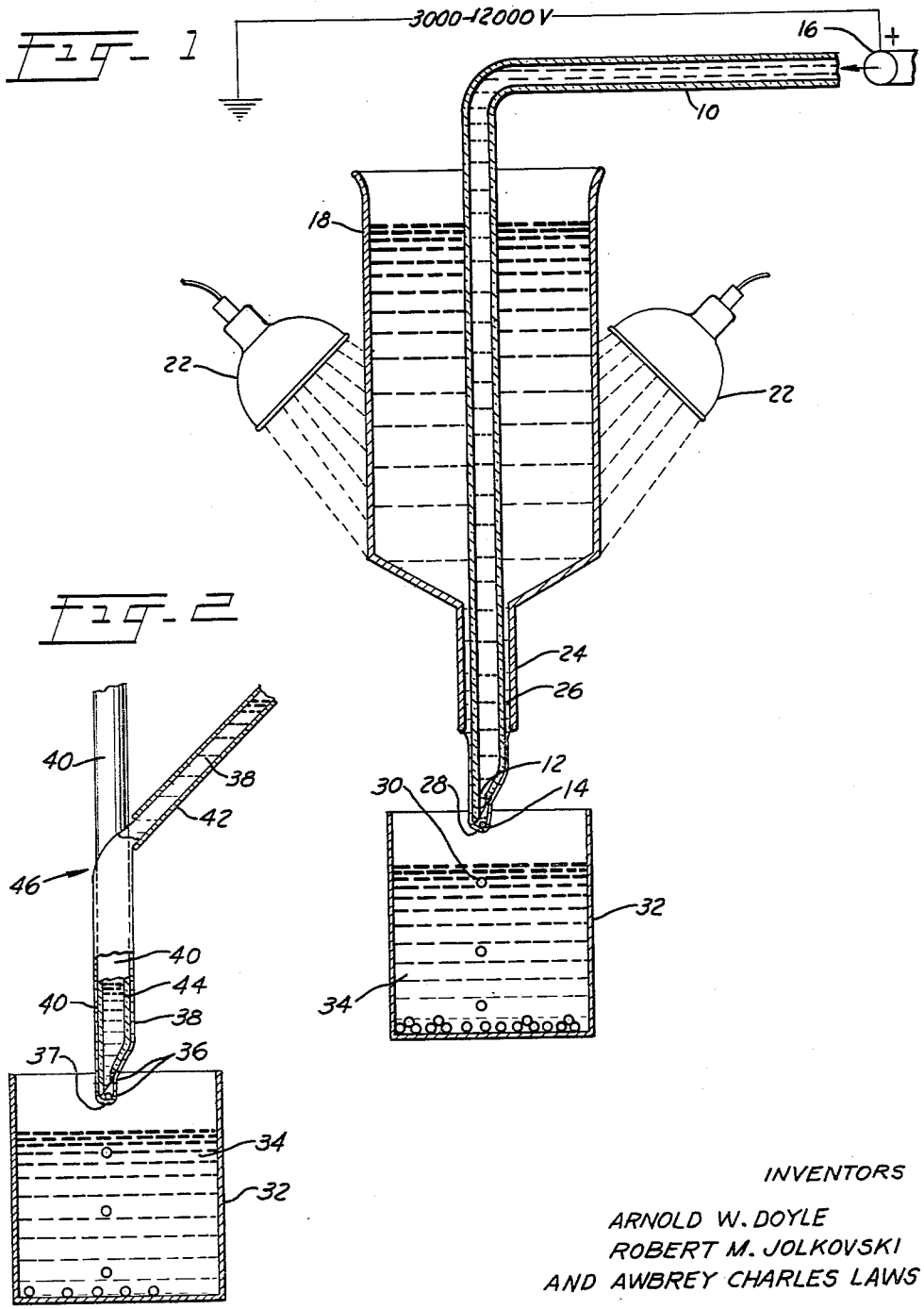
INVENTORS
ARNOLD W. DOYLE
ROBERT M. JOLKOVSKI
AND AWBREY CHARLES LAWS
BY Bair, Freeman & Molinare
ATTORNEYS

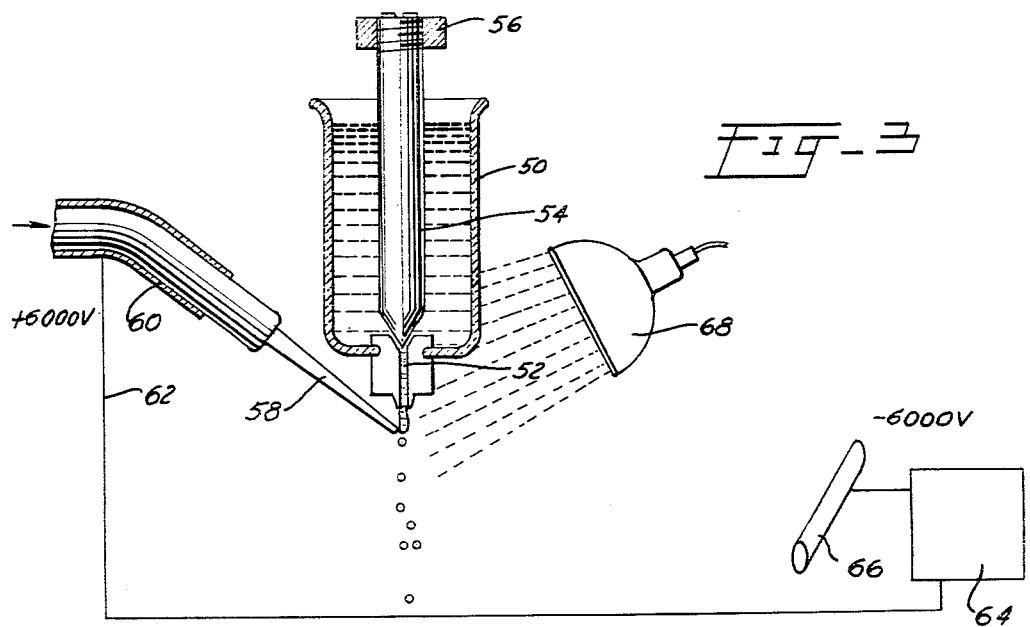
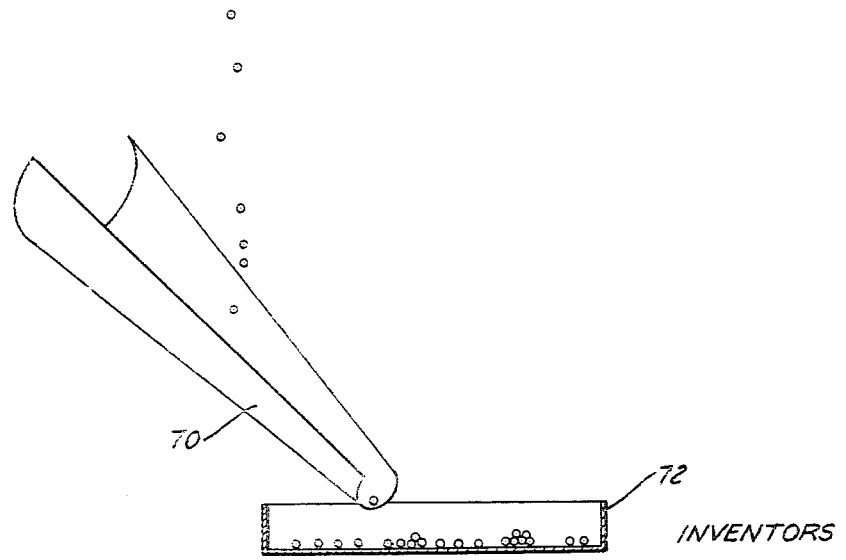
INVENTORS
ARNOLD W. DOYLE
ROBERT M. JOLKOVSKI
AND AWBREY CHARLES LAWS
BY Bair, Freeman & Molinare
ATTORNEYS 3,160,686
PROCESS FOR MAKING CAPSULES
Arnold W. Doyle, Watertown, and Robert M. Jolkovski and Awbrey Charles Laws, Boston, Mass., assignors, by mesne assignments, of fifty percent to Delavan Manufacturing Company, West Des Moines, Iowa, a corporation of Iowa, and fifty percent to The Aro Corporation, Bryan, Ohio, a corporation of Ohio
Filed Aug. 1, 1962, Ser. No. 214,092
13 Claims. (Cl. 264—4)

This invention relates to a method and apparatus for encapsulating liquids, and more particularly for encapsulating the liquid in drops of desired size in a thermoplastic shell.

One object of the invention is to provide a high speed method for making liquid-containing capsules of small and regular size having a thin uniform thermoplastic shell, and simple apparatus for carrying out this method.

Another object is to provide such a method in which an electrostatic charge is imparted to the liquid to be encapsulated, the size of the capsules being controlled by adjusting the magnitude of the electrical charge on the liquid, and the field in the vicinity of the forming capsules.

Another object is to provide such a process in which the droplet is formed substantially simultaneously with the coating or shell, and the electrical charge on the formed capsules causes the capsules to repel each other, thus avoiding agglomeration.

A further object is to provide a capsulating process which is versatile with respect to control of shell thickness, capsule size and method of cooling.

The invention finds use in capsulating liquids such as water, oils, pharmaceuticals which require a protective coating. The thermoplastic coating comprising the shell of the capsule must, of course, be insoluble or non-swellable in the liquid being capsulated. The invention is particularly suitable for producing capsules of a size intermediate conventional medicament gelatin capsules and extremely small microcapsules. The dies used in making the former cannot be designed for capsules smaller than about 4 mm. in diameter, while the process used in making the latter is limited to microscopic size.

In the drawings which show a preferred apparatus for practicing the invention,

FIGURE 1 is a sectional schematic view of said apparatus;

FIGURE 2 is a modified form of the apparatus of FIGURE 1, showing different means for handling the thermoplastic encapsulating material; and FIGURE 3 is a similar view of a modified apparatus useful in capsulating liquids which are not electrically conductive, and which illustrates alternative material feed means.

The invention will be described with reference to the encapsulation of an amine useful in accelerating the curing or hardening of epoxy type resins, although it will be understood that the materials described are illustrative and not limiting of the invention.

A conduit or tube 10 having a restricted orifice 12 is provided for discharging droplets 14 of an electrically-conductive amine such as triethylene tetramine. The liquid amine is fed to the tube 10 at a controlled rate, as by a constant rate pump, not shown. The orifice 12 is preferably of small size, for example, 1 mm. The size of the droplets of any particular liquid is suitably controlled by the rate of liquid feed and additionally by an electrical charge imparted to the liquid as indicated schematically at 16 by an electrode of an electrostatic generator. Thus the size of the droplets may be controlled by the magnitude of the voltage. We have found that for each increase of about 200 volts in the range from 3000 to 12,000 volts, the diameter of the droplets is reduced by approximately one-half. Most effective operation lies in the range of 6000 to 12,000 volts. When the droplets break from the orifice 12 the surface is charged with an excess of electrons. Due to the uniform charge distribution over the conductive surface, the droplets assume a regular spherical shape. The particles may be reduced to extremely small size by this method, say less than 0.1 mm.

A container 18 surrounds the vertical portion of the conduit 10 and is of restricted diameter at its lower end to form a concentric tube 24 around the conduit with a slight annular space 26 therebetween. A suitable thermoplastic coating material, such as wax, is deposited in the container 18. The thermoplastic coating is heated by any convenient heating means, e.g., infrared lamps 22, so that it is maintained in a desired molten state. The viscosity of the thermoplastic coating should permit fluid flow freely through annular space 26. The coating forms a closure 28 over the end of the orifice which breaks and forms around each drop 14 as it is discharged from the orifice. The head of coating in container 18 preferably is maintained at a constant level to provide a constant flow rate at the discharge orifice.

The restricted dimension of the annular opening or passageway 26, as well as the viscosity, regulates the thickness of thermoplastic flowing therethrough and as the amine droplets fall through the coating, the coating uniformly encapsulates each particle with a layer of thermoplastic material about 0.1 mm. thick to form the encapsulated particle 30. A vessel 32 containing a cold water bath 34, for example, serves to receive the coated droplets 30 as they fall. The cold bath serves to harden the thermoplastic about the liquid particles.

In the form of the invention shown in FIG. 2, liquid droplets 36 and thermoplastic coating 38 are simultaneously discharged from tubes 40 and 42 respectively. The coating 38 flows from the end of inclined tube 42 down the sides of the tube 40 and serves to form a film 37 over the end of the orifice through which liquid particles are discharged and encapsulated with coating 38. The thermoplastic shell may be cooled in the liquid bath 34, or it may be air cooled by passing through cold air.

The encapsulated amines made in accordance with the invention find particular use as a catalyst for epoxy resins and polyurethane resins. Triethylene diamine is one amine useful for polyurethanes. The protective shell permits the amine to be added in predetermined accurate quantities to the resin. The catalyst is protected by the shell which prevents reaction between the amine and the resin until ready for use, whereupon the shell is ruptured as by spraying through the nozzle of a spray gun. The same technique has been used to encapsulate other materials in protective shells such as other types of curing agents for polyurethane resins, e.g., aqueous solutions of stannous octoate and other stannous compounds. Pharmaceuticals in oil or aqueous dispersions can also be capsulated in this manner.

The thermoplastic shell may be made from low melting polyethylenes, such polyethylenes in admixture with wax, plasticized vinyl resins, gelatin and similar compounds or mixtures which soften to fluid viscosity at reasonable elevated temperatures.

Reference is now made to FIG. 3, a preferred apparatus for encapsulating liquids, particularly those of low conductivity. In this form the electrostatic charge is applied to the discharge orifice near the end thereof rather than to the liquid itself, as in FIGURE 1. The thermoplastic coating material is disposed in container 50 having discharge orifice 52 in the bottom thereof, the size of which is regulated by a needle valve 54 with a screw adjustment 56. The liquid is discharged in droplets from a needle 58 connecting to a supply tube 60, both of which are electrically conductive. One terminal 62 of a D.C. source of voltage 64 connects to the tube 60. The other terminal connects to an electrode 66 adjacent the space into which the capsules fall. The end of the needle orifice 58 is disposed directly in the path of the molten thermoplastic material so that the liquid droplets are coated as they are formed. An infrared heater 68 keeps the thermoplastic material molten during the capsule formation. A paper chute 70 is provided at a point a sufficient distance below the nozzles to permit the shell to set in passing through the air. The chute funnels the capsules into a flat receiving pan 72.

In the illustrative embodiment of FIG. 3 the pan 72 may be placed about 6 or 7 inches below the needle orifice 58, and the electrode 66 from 4 to 10 inches laterally from the capsule path. Using a 5% aqueous solution of diethylene triamine (distilled water) as the liquid to be encapsulated, at a flow rate of 0.9 cc. per minute through a No. 22 hypodermic needle cut short, tiny spherical capsules were formed about 0.75 mm. in diameter. The thermoplastic material was paraffin containing 7% polyethylene-vinyl acetate, maintained at 160° F.

We claim:

1. A method for encapsulating liquid drops which comprises introducing said liquid into a conduit having a restricted orifice at the discharge end thereof, applying an electrostatic charge to the liquid, discharging small charged drops individually from said orifice, and as they are being discharged enclosing each of said drops within a thin shell of molten thermoplastic material flowing to said orifice.

2. A method for encapsulating liquid drops which comprises introducing said liquid into a conduit having a restricted orifice at the discharge end thereof, applying an electrostatic charge to the liquid, discharging small charged drops individually from said orifice, and flowing molten thermoplastic coating material to said orifice from a point above said orifice to enclose the drops within a thin shell of said coating material as they are being discharged.

3. A method for encapsulating an electrically conductive liquid in individual droplets which comprises pumping said liquid through a conduit terminating in a restricted orifice, applyng an electrostatic charge to said liquid, thereby causing small spherical drops to be discharged from said orifice, causing a molten thermoplastic resinous material to flow down the outside of said conduit to a point beneath said orifice to enclose each of said drops upon discharge within a thin shell of said molten material, and cooling said drops to solidify said shell.

4. The method of claim 3 in which said liquid is an amine and said thermoplastic material comprises wax.

5. An apparatus for continuous production of encapsulated liquid drops which comprises a conduit terminating in a restricted orifice, means for flowing said liquid through said conduit at a uniform rate, an electrostatic generator for electrically charging said liquid, means outside said conduit for causing a molten coating material to flow continuously around said conduit orifice to enclose liquid drops discharged from said orifice in a shell of said molten material, and means for cooling said shell.

6. The apparatus of claim 5 which includes heating means to maintain said molten material in the molten state until it reaches said orifice.

7. An apparatus for continuous production of encapsulated liquid drops which comprises a conduit terminating in a restricted orifice, means for flowing said liquid through said conduit at a uniform rate, an electrostatic generator having one electrode disposed in said liquid, a container for coating material surrounding said conduit and terminating in a tube concentric with said conduit toward said orifice end, heating means surrounding said container, and a liquid cooling bath disposed below said orifice.

8. In a method for encapsulating particles discharged from a restricted orifice in a rupturable shell, the improvement comprising the steps of electrically charging said particles to form the particles in the desired size as they are discharged from said orifice, conducting a stream of a molten thermoplastic material to said orifice and causing said stream to flow around said particles to form a coating on each, and freezing said coating.

9. An apparatus for continuous production of encapsulated liquid drops which comprises an electrically-conductive tube having a small discharge orifice in one end thereof, a container for molten thermoplastic coating material disposed above said discharge orifice, an opening in said container for emitting said coating material at said discharge orifice at a predetermined rate, an electrostatic generator having one electrode connected to said tube and another electrode disposed adjacent to but below said discharge orifice to provide a potential difference between said electrodes, and means below said discharge orifice for receiving charged encapsulated liquid drops therefrom.

10. The apparatus of claim 9 in which said potential difference ranges from 3000–12,000 volts.

11. A method for encapsulating liquid droplets which comprises discharging said droplets from an orifice into an electrostatic field, while simultaneously conducting molten thermoplastic coating material to said orifice and flowing said coating material around said droplets as the droplets emerge from said orifice, cooling the molten coating to provide a solidified shell around said droplets, and collecting the encapsulated droplets.

12. A method for encapsulating liquid in individual droplets which comprises flowing said liquid through a conduit terminating in a restricted orifice, applying an electrostatic charge to said liquid to cause individual uniform droplets to be discharged from said orifice, causing a stream of molten coating material to flow over the end of said orifice to enclose each of said droplets upon discharge within a thin shell of said molten material, and providing an electrostatic field surrounding the droplets as they are being encapsulated.

13. A method for encapsulating liquid in individual droplets which comprises pumping said liquid through a conduit terminating in a restricted orifice, applying an electrostatic charge to said liquid, thereby causing small spherical drops to be discharged from said orifice, providing a film of molten coating material beneath said restricted orifice into which said drops fall as they are discharged from said orifice, enclosing the drops in said film, and cooling said drops to solidify said shell.

References Cited in the file of this patent

UNITED STATES PATENTS

| | | |
|---|---|---|
| 2,275,154 | Merrill et al. | Mar. 3, 1942 |
| 2,339,114 | Scherer | Jan. 11, 1944 |
| 2,766,478 | Raley et al. | Oct. 16, 1956 |
| 2,799,897 | Jansen | July 23, 1957 |